United States Patent
Gattani et al.

(10) Patent No.: US 12,271,396 B2
(45) Date of Patent: Apr. 8, 2025

(54) DISCOVERY OF DISCRETE PARTITIONING INFORMATION

(71) Applicant: Oracle International Corporation, Redwood Shores, CA (US)

(72) Inventors: Rohit Jaykumar Gattani, Pleasanton, CA (US); Rahul Gupta, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/225,827

(22) Filed: Jul. 25, 2023

(65) Prior Publication Data

US 2025/0036652 A1    Jan. 30, 2025

(51) Int. Cl.
*G06F 16/25* (2019.01)
*G06F 16/27* (2019.01)

(52) U.S. Cl.
CPC .......... *G06F 16/278* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 7,024,401 B2 | 4/2006 | Harper et al. | |
| 7,814,142 B2 | 10/2010 | Mamou et al. | |
| 10,356,150 B1 | 7/2019 | Meyers | |
| 11,621,966 B1 * | 4/2023 | Yu | G06F 16/278 |
| 2005/0160055 A1 * | 7/2005 | Boulle | G06F 16/27 |
| | | | 707/999.107 |
| 2008/0313246 A1 * | 12/2008 | Shankar | G06F 16/24554 |
| | | | 707/E17.054 |
| 2011/0066593 A1 | 3/2011 | Ahluwalia et al. | |
| 2012/0143090 A1 * | 6/2012 | Hay | G06F 16/54 |
| 2015/0356149 A1 | 12/2015 | Dagli et al. | |

(Continued)

FOREIGN PATENT DOCUMENTS

| | | |
|---|---|---|
| CN | 110737683 | 1/2020 |
| KR | 20220096049 | 7/2022 |

OTHER PUBLICATIONS

"Source Partitioning", Amazon Redshift Connectors, Cloud Data Integration Connectors, Nov. 29, 2022, 1 page.

(Continued)

*Primary Examiner* — Son T Hoang
(74) *Attorney, Agent, or Firm* — Kilpatrick Townsend & Stockton LLP

(57) ABSTRACT

A system for data partitioning based on discovery of discrete partitioning information. The system can receive data sets in table format from source system. The data can be stored in the source system to be partitioned and transmitted from the source system to a target system. The system can determine a respective partitioning column for each data set. The system can determine a number of partitions. The system can determine, for each data set, a respective set of discrete values from the plurality of discrete values of the respective partitioning column. The number of the discrete values of the set of discrete values can be based at least in part on the number of partitions. The system can the discrete value sets with each other. The system can determine a final set of discrete values based at least in part on the comparison.

17 Claims, 12 Drawing Sheets

| | Training Set | Discrete Values | Cumulative Deviation | Rank |
|---|---|---|---|---|
| 502 | 1 | CA, (FL,NJ), TX | (0+0) + (0+0) + (1+1) = 2 | 1 |
| 504 | 2 | (CA,FL), NJ, TX | (0+1) + (0+1) + (1+1) = 4 | 2 |
| 506 | 3 | (CA, FL) ,NJ, TX | (0+1) + (0+1) + (1+1) = 4 | 2 |

| | Selected Discrete Values | CA | (FL,NJ) | TX |
|---|---|---|---|---|
| 508 | Occurrences | 7 (35%) | 7(35%) | 6(30%) |

(56) References Cited

U.S. PATENT DOCUMENTS

2020/0125666 A1* 4/2020 Eadon ............... G06F 16/24557
2020/0311062 A1   10/2020 Mihm et al.
2022/0261390 A1*  8/2022 Creasey ............. G06F 16/2386
2024/0202210 A1*  6/2024 Gattani ................... G06F 16/27

OTHER PUBLICATIONS

Ives et al., "Adapting to Source Properties in Processing Data Integration Queries", Available Online at: https://homes.cs.washington.edu/~alon/files/aqp04.pdf, Jun. 13-18, 2004, 12 pages.

Vieira, "Use PK Chunking to Extract Large Data Sets from Salesforce", Available Online at: https://developer.salesforce.com/blogs/engineering/2015/03/use-pk-chunking-extract-large-data-sets-salesforce, Mar. 23, 2015, 4 pages.

U.S. Appl. No. 18/084,421, "Non-Final Office Action", Feb. 27, 2024, 27 pages.

\* cited by examiner

| Training Set | Discrete Values | Cumulative Deviation | Rank |
|---|---|---|---|
| 1 | CA, (FL,NJ), TX | (0+0) + (0+0) + (1+1) = 2 | 1 |
| 2 | (CA,FL), NJ, TX | (0+1) + (0+1) + (1+1) = 4 | 2 |
| 3 | (CA, FL), NJ, TX | (0+1) + (0+1) + (1+1) = 4 | 2 |

| Selected Discrete Values | CA | (FL,NJ) | TX |
|---|---|---|---|
| Occurrences | 7 (35%) | 7(35%) | 6(30%) |

FIG. 5

DISCOVERY OF DISCRETE PARTITIONING INFORMATION

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

A CSP customer can request that a CSP service transmit data from a source system to a target system. For large data sets, the CSP service be tasked with determining how to partition the data to efficiently transmit the data.

BRIEF SUMMARY

Embodiments described herein are directed toward a method for discovery of discrete partitioning information. The method can include a computing system receiving a plurality of data sets sampled from data stored in a source system, each data set of the plurality of data sets organized in a table format comprising a plurality of columns. The data can be stored in the source system to be partitioned and transmitted from the source system to a target system.

The method can further include the computing system determining, for each data set, a respective partitioning column from the plurality of columns, each respective partitioning column comprising a plurality of discrete values.

The method can further include the computing system determining a number of partitions to partition the data stored in the source system.

The method can further include the computing system determining, for each data set, a respective set of discrete values from the plurality of discrete values of the respective partitioning column. The number of the discrete values of the set of discrete values can be based at least in part on the number of partitions.

The method can further include the computing system comparing each respective set of discrete values with each other respective set of discrete values based at least in part on a respective distribution of discrete values of each respective set of discrete values.

The method can further include the computing system determining a final set of discrete values to be used for partitioning the data based at least in part on the comparison of each respective set of discrete values with each other respective set of discrete values.

The method can further include the computing system partitioning the data stored in the source system based at least in part on the final set of discrete values.

Embodiments can further include a computing system, including one or more processors and a computer-readable medium including instructions that, when executed by the processor, can cause the one or more processors to perform operations including receiving a plurality of data sets sampled from data stored in a source system, each data set of the plurality of data sets organized in a table format comprising a plurality of columns. The data can be stored in the source system to be partitioned and transmitted from the source system to a target system.

The instructions that, when executed by the one or more processors, can further cause the one or more processors to perform operations including determining, for each data set, a respective partitioning column from the plurality of columns, each respective partitioning column comprising a plurality of discrete values.

The instructions that, when executed by the one or more processors, can further cause the one or more processors to perform operations including determining a number of partitions to partition the data stored in the source system.

The instructions that, when executed by the one or more processors, can further cause the one or more processors to perform operations including determining, for each data set, a respective set of discrete values from the plurality of discrete values of the respective partitioning column. The number of the discrete values of the set of discrete values can be based at least in part on the number of partitions.

The instructions that, when executed by the one or more processors, can further cause the one or more processors to perform operations including comparing each respective set of discrete values with each other respective set of discrete values based at least in part on a respective distribution of discrete values of each respective set of discrete values.

The instructions that, when executed by the one or more processors, can further cause the one or more processors to perform operations including determining a final set of discrete values to be used for partitioning the data based at least in part on the comparison of each respective set of discrete values with each other respective set of discrete values.

The instructions that, when executed by the one or more processors, can further cause the one or more processors to perform operations including partitioning the data stored in the source system based at least in part on the final set of discrete values.

Embodiments can further include a non-transitory computer-readable medium having stored thereon instructions that, when executed by one or more processors, causes the one or more processors to perform operations including receiving a plurality of data sets sampled from data stored in a source system, each data set of the plurality of data sets organized in a table format comprising a plurality of columns. The data can be stored in the source system to be partitioned and transmitted from the source system to a target system.

The instructions that, when executed by the one or more processors, can further cause the one or more processors to perform operations including determining, for each data set, a respective partitioning column from the plurality of columns, each respective partitioning column comprising a plurality of discrete values.

The instructions that, when executed by the one or more processors, can further cause the one or more processors to perform operations including determining a number of partitions to partition the data stored in the source system.

The instructions that, when executed by the one or more processors, can further cause the one or more processors to perform operations including determining, for each data set, a respective set of discrete values from the plurality of discrete values of the respective partitioning column. The number of the discrete values of the set of discrete values can be based at least in part on the number of partitions.

The instructions that, when executed by the one or more processors, can further cause the one or more processors to perform operations including comparing each respective set of discrete values with each other respective set of discrete values based at least in part on a respective distribution of discrete values of each respective set of discrete values.

The instructions that, when executed by the one or more processors, can further cause the one or more processors to perform operations including determining a final set of discrete values to be used for partitioning the data based at least in part on the comparison of each respective set of discrete values with each other respective set of discrete values.

The instructions that, when executed by the one or more processors, can further cause the one or more processors to perform operations including partitioning the data stored in the source system based at least in part on the final set of discrete values.

BRIEF DESCRIPTION OF THE DRAWINGS

FIG. 5 is an illustration of determining discrete values for partitioning, according to one or more embodiments.

DETAILED DESCRIPTION

Figure 1:
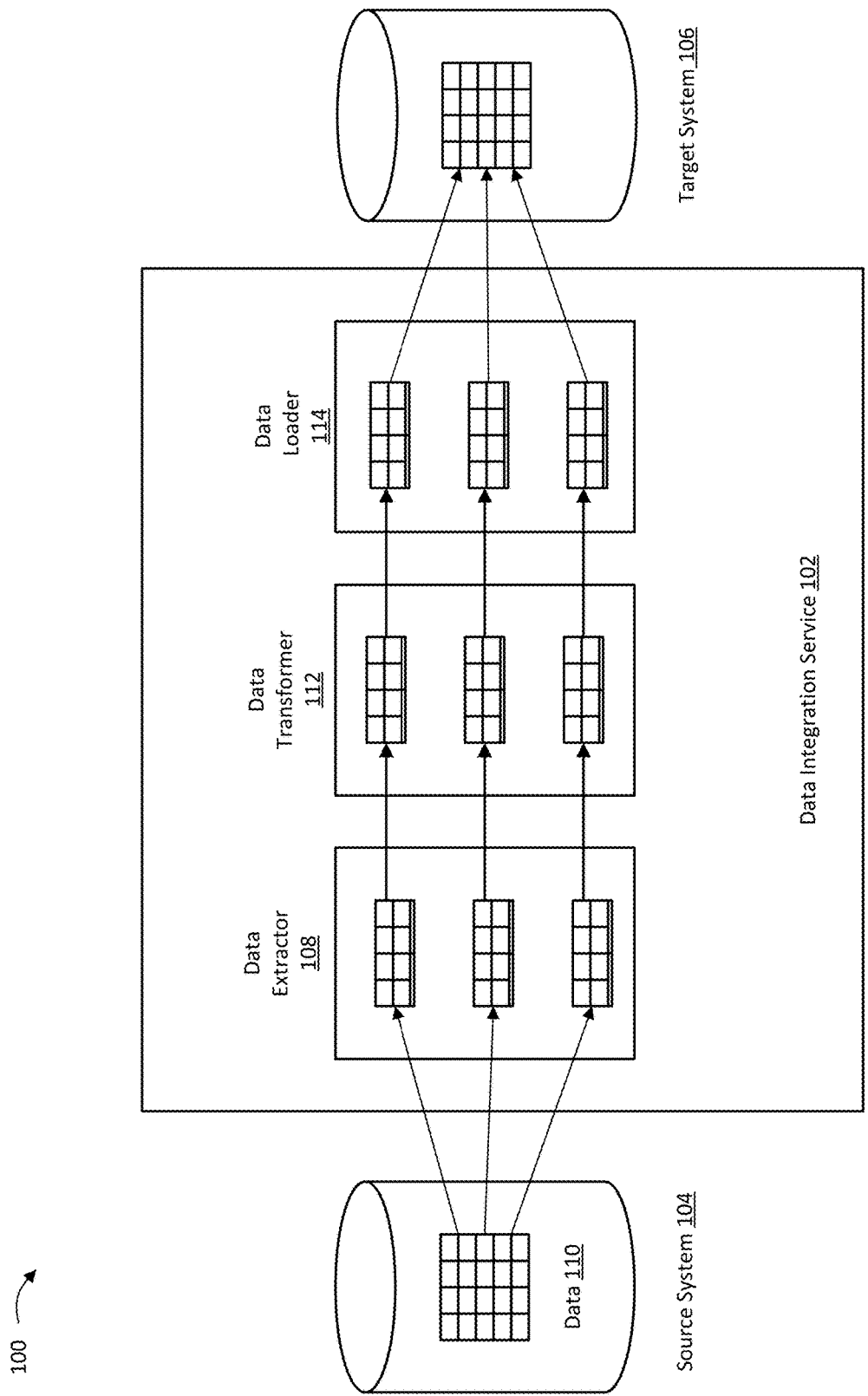
FIG. 1 is an illustration of a data transmission using a discovery of discrete partitioning information, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) can offer a data integration service for transmitting data from a source system to a target system. The data integration service can be implemented using a cloud service infrastructure, including the cloud service's servers, and networking capabilities. For example, a CSP customer may need to analyze some data stored in the customer's database, and the customer's analytical tools may be located in another system. The customer can request that a portion of the customer's data be retrieved from the customer's database and transferred to an analytics system. The CSP's data integration service can receive a request from the customer to transmit data from the customer database to the analytics system. The data integration service can transmit the data from the customer database to the analytics system.

In some instances, the data stored at the data entity (e.g., the source system from which data can be extracted) can be a very large data set (e.g., terabytes of data). Extracting a large data set as a whole over a cloud network can strain the cloud network's bandwidth resulting in slower transfer speeds and extraction times. Thus, in order to for the data integration service to achieve an optimal data extraction performance, the service can partition the large data set and separately extract smaller partitioned data chunks/pieces. The data integration service can further employ a set of virtual machines to transmit the data chunks/pieces to the target system in parallel. This can improve the overall performance of the data integration job.

In order to extract the data in a partitioned manner, the data integration service can receive partitioning information to be used to determine how to partition the data into the chunks/pieces. The data integration service can receive this partitioning information through various manners. The source system can include partitioning information as to how to partition the data for extraction. For example, the source system has stored the data in a partitioned manner (e.g., partitioned tables or column partitioned files stored in an object store) and can provide the partitioning information to a data extractor. In another example, the customer can provide partition information to the data integration service.

One issue that can occur is if the source system does not include partitioning information, or if the customer is unable to or has not provided partitioning information. A data integration service can elect to define partitioning parameters. However, improper data partitioning can lead to unwanted data reorganization, too many partitions can lead to excessive task scheduling, too few partitions can lead to excessive memory and processing issues, and skewed data partitions can lead to uneven workloads between processing units.

Embodiments of the present disclosure address the above-referenced issues by providing techniques for the discovery of source partitioning information. The herein described techniques can be used to discover partitioning information to be used to partition and extract data from a source system. A user can request a data integration service to extract data from a source system and transmit the data to a target system. A data extractor of the data integration service can communicate with a source system to determine whether the source system includes partitioning information. If the partitioning information is available at the source system, the user can elect to partition the data pursuant to the information. If the source system does not have partition information, or if the user elects not to use the source system's partition information, the user can either provide partitioning information or request that a data extractor perform the discovery of partitioning information.

The data extractor can rely on four components to discover partitioning information: a partitioning discoverer, a sampler, a profiler, and a recommender. The data extractor can send a request to the partitioning discoverer to gather and provide source partitioning information for the data stored at the source system. The partitioning discoverer can send a request to the sampler to gather and provide training and validation sets of the data stored at the source system. The data can be structured as a table of values at the source system. In some instances, the request can include user preferences for selecting a partitioning column. The partitioning column can be a data table column whose values are amenable to being divided using discrete values and used to form the partitions. The sampler can extract requested training sets and validation sets from the source system and transmit the sets to the partitioning discoverer.

The partitioning discoverer can receive the training and validation sets of the data from the sampler. The partitioning discoverer can transmit the training and validation sets of the data to the profiler along with a request for discrete values to partition the data at the source system. In some instances, the partitioning discoverer can further transmit a required number of partitions to the profiler. The profiler can analyze and process the training and to generate candidate discrete values from the training sets. The profiler can further transmit the candidate discrete values back to the partitioning discoverer.

The partitioning discoverer can transmit the candidate discrete values to the recommender. The recommender can analyze the candidate discrete values for each sample and recommend a set of discrete values for partitioning the data stored at the source system. The recommender can further transmit the recommended discrete values to the partitioning discoverer. The partitioning discoverer can transmit partitioning information, including the discrete values for the partitions, to the data extractor. The data extractor can extract data from the source system using the partitioning information and transmit the partitioned data to a target system. In some instances, the data at the source system may not be uniformly distributed. The embodiments described herein permit the data extractor to partition the data in equal divisions across a first element and a last element of the data to be partitioned. The data integration service can use the data extractor to retrieve the partitioned data from the source system and migrate the data to a target system.

FIG. 1 is an illustration 100 of a data transmission using a discovery of discrete partitioning information, according to one or more embodiments. A data integration service 102 can receive instructions from a user to transmit data from a source system 104 to a target system. The data integration service 102 can employ a data extractor 108 that is configured to discover discrete partitioning information from the source system 104. The data integration service 102 can be a service offered by a CSP and can be implemented using one or more servers of a cloud service infrastructure as described below. Each of the servers can employ one or more virtual machines to employ the functionality described herein. The source system 104 can include one or more databases that store data, such as data that is to be transmitted to the target system 106.

The source system 104 can store the data 110 that is to be transferred to the target system 106. The size of the data 110 can be large enough that transmitting the data as a single block is impractical. Therefore, the data integration service 102 can look for partitioning information to partition the data 110 from various sources. The data integration service 102 can determine whether the source system 104 includes partitioning information, such as discrete values for partitioning the data 110. The data integration service 102 can also look to whether the user (e.g., the CSP customer) that requested the data to be transferred has provided any partitioning information. If neither the source system 104 nor the customer can provide partitioning information, the data extractor 108 can perform a discovery process to determine discrete partitioning information.

The data extractor 108 can access data 110 from the source system. The data extractor 108 can access the data 110 to be transmitted to the target system 106. The data extractor 108 can further use a sampling technique to sample the data and identify partitioning information that can be used to partition the data 110. The partitioning information can include, for example, discrete values in the data 110 that can be used for partitioning. For example, the data 110 may include daily temperature values for a ten year period (e.g., 2001-2010). The data extractor 108 can use one or more herein described techniques to identify the year as a discrete value to be used to partition the data. In this example, all of the temperature values for the year 2001 can be included in one partition, all of the temperature values for the year 2002 can be included in another partition, and so forth.

The data extractor 108 can extract the data 110 from the source system 104 using the determined partitioning information and transmit the partitioned data to a data transformer 112. In some instances, the data extractor can use a set of virtual machines to extract and transmit the partitions in parallel. The data transformer 112 can transform the format of the partitioned data from the source system's format to the target system's format. The data transformer 112 can transmit the transformed data to a data loader 114. The data loader 114 can load the partitioned data onto the target system 106. The target system 106 can reassemble the partitioned data and make the data available for use.

Figure 2:
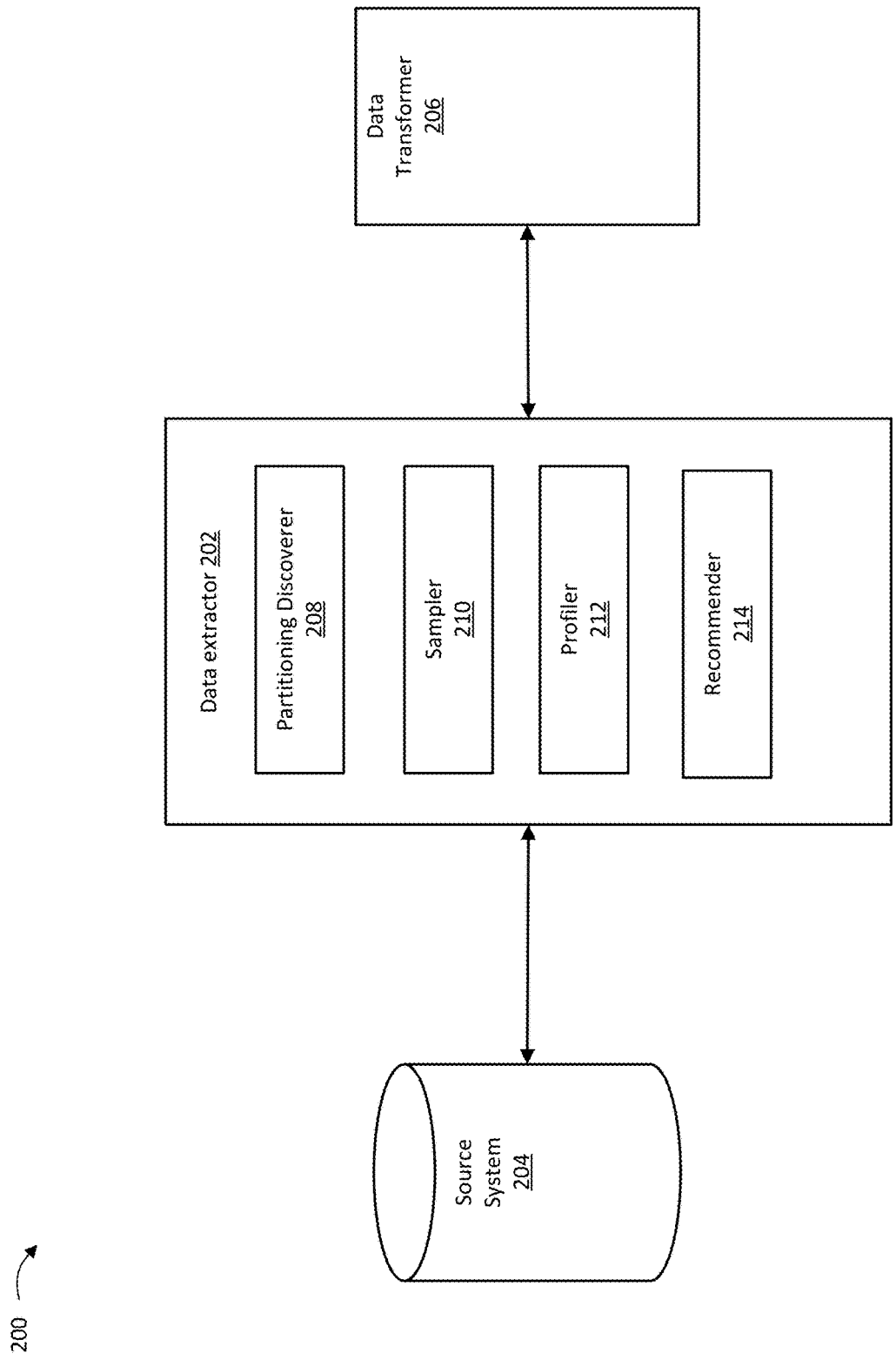
FIG. 2 is an illustration of a data extractor for the discovery of discrete partitioning information, according to one or more embodiments.

FIG. 2 is an illustration 200 of a data extractor for the discovery of discrete partitioning information, according to one or more embodiments. As illustrated, the data extractor 202 (e.g., data extractor 108) can be in operable communication with a source system 204 (e.g., source system 104) and a data transformer 206 (e.g., data transformer 112), where each can be implemented by one or more computing devices. The data extractor 202 can be part of a data integration service of a CSP. The data extractor 202 can employ one or more units (e.g., partitioning discoverer 208, sampler 210, profiler 212, and recommender 214) for the discovery of discrete partitioning information. The data extractor 202 can use the units to determine discrete information to partition data stored at the source system 204.

The partitioning discoverer 208 can receive control instructions for performing the discovery of discrete value partitioning information. The control instructions can include an identity of the source system 204 and a description of data (e.g., data 110) to be extracted and transmitted from the source system 204 to a target system (e.g., target system 106). The description can include a data type, a format, size, and address(es) for the data. The control instructions can further include instructions to identify discrete values in the data to be used as partitioning information.

In response to receiving the control instructions, the data extractor 202 can transmit a request to the partitioning discoverer 208 for partitioning information, including a number of partitions and the boundaries for each partition.

The partitioning discoverer 208 can transmit a request to the sampler 210 for a set of training and validation sets from the data in the source system 204 to be transmitted to the target system. The training sets can be used to determine the discrete values to be used to partition that data. A validation set can be used to validate the determined discrete values.

The sampler 210 can either rely on the source system 204 to provide sample data or use one or more sampling techniques to sample data from the source system 204. For example, the data can be stored at the source system 204 as a data table with metadata providing descriptions of column and row values. The sampler 210 can retrieve samples (e.g., blocks of one or more columns of data and one or more associated rows of data) from the source system 204. For example, if a table contains one thousand columns (col.

1-col. 999) and one thousand rows (row 1-row 999), a sample can include a subset of rows and columns. For example, the sampler 210 can generate a sample that includes the values of columns 400-450 and associated rows 1-999. The sampler 210 can retrieve multiple samples from the source system 204 that can be used as training and validation sets and provide the samples to the partitioning discoverer 208.

The partitioning discoverer 208 can further determine the number of partitions based on various parameters. The parameters can include, for example, the resources (e.g., cores, threads allowed) that are available for the data extractor to use to partition and extract the data from the source system. As indicated above, the data extractor 202 can initialize multiple virtual machine instances to extract the data. The virtual machine instances can work in parallel to extract respective partitions from the source system 204 and transmit the partitions to the data transformer. As the demands on the cloud infrastructure can be fluid, the available resources can fluctuate based on the number of resources that are being used for other cloud computing tasks. Therefore, the number of partitions can be dynamically determined by the partitioning discoverer 208 based on the available resources.

The parameters can also include the consumption capacity of a downstream process. For example, the partitioning discoverer 208 can take into account the current workload capacity of the data transformer 206. For example, the data transformer 206 may be currently performing a large number of tasks unrelated to herein described processes, and may not have as much capacity as when the data transformer 206 is performing a small number of tasks. In the instance that the data transformer has a low capacity or high capacity, the partitioning discoverer 208 can determine the number of partitions based on the current capacity.

The parameters can also include an acceptable data extraction session to the source system 204. For example, the partitioning discoverer 208 can determine whether the source system 204 can accommodate a large number of partitions, a medium number of partitions, or a small number of partitions. In some instances, the number of partitions that the source system 204 can accommodate can be provided by the user that has requested the data to be migrated to the target system.

The partitioning discoverer 208 can further determine a partitioning column from the training and validation sets, which include a discrete column values to be used to partition the data. The partitioning discoverer 208 can undergo a series of steps to determine the partitioning column. The partitioning discoverer 208 can determine whether any of the columns or set of columns are a key column(s). A key column can include a unique value to identify each row. For example, a key column can include row identifiers (e.g., row 1, row 2, row 3, . . . ). As each key column value is unique, the key column values may not be suitable for identifying discrete values for partitioning. Therefore, the partitioning discoverer 208 can eliminate any key columns as candidate partitioning columns.

The partitioning discoverer 208 can determine whether the user provided any partitioning column criteria, such as the identity of a partitioning column or a preferred characteristics of a partitioning column. The partitioning discoverer 208 can further determine whether the user has provided any criteria for selecting a partitioning column and give any columns that match the user criteria over columns that do not match the user's criteria. The partitioning discoverer 208 can rank all columns against one another based on datatype, key information, and user preference to select a partitioning column.

The partitioning discoverer 208 can use a partitioning column discovery algorithm to determine the partitioning column. For example, the partitioning discoverer 208 can provide the remaining columns after eliminating the key columns, and any user provided information to the partitioning column discovery algorithm. The partitioning column discovery algorithm can output an identity of the partitioning column.

The partitioning discoverer 208 can transmit the training and validation sets to the profiler 212 along with a number of partitions, request for a list of candidate discrete values.

The profiler 212 can analyze the training sets and identify the discrete values from the partitioning column. The profiler 212 can further determine a frequency of each discrete value in the partitioning column to determine if the frequency of the discrete value is equal to or greater than a threshold. For example, if the partitioning column includes a list of countries in which employees reside, the profiler 212 can determine whether the frequency of each country is equal to a threshold frequency. In some embodiments, the profiler 212 can use the following formula:

$$\text{Threshold frequency} <= (x/\text{number of partitions})*100,$$

where x is a variable fraction between 0 and 1. The default value for x can be 0.5. The closer x is to 1, the higher the frequency can be for a partitioning column value to qualify as a discrete value to be used for partitioning. The closer to 0, the lower the frequency can be for a partitioning column value to be a discrete value to be used for partitioning.

The profiler 212 can evaluate each partitioning column value until the number of identified discrete values equals the number of partitions. In some instances, if the profiler determines that the partitioning column includes too few discrete values or too many discrete values, then the profiler 212 can combine two or more partitioning column values, such that the number of discrete values equals the number of partitions.

For example, a partitioning column can include values A, B, C, and D and the partitioning discoverer 208 can determine that the number of partitions is 3. In one instance, the profiler 212 can determine that the respective frequency of As and Bs in the partitioning column is equal to or greater than the threshold. However, the profiler 212 can further determine that neither the frequency of Cs or Ds is equal to or greater than the threshold. Therefore, the profiler 212 can values to increase the number of discrete values to the number of partitions. For example, the profiler 212 can combine the Cs and Ds to be considered a single discrete value (e.g., (C, D)), where the combined frequency of C and D in the partitioning column is equal to or greater than the threshold. In this sense, the profiler has identified 3 discrete values (e.g., A, B, and (C, D)), and the number of discrete values equals the determined number of partitions.

In another instance, the profiler 212 can determine that the respective frequency of As Bs, Cs, and Ds in the partitioning column is equal to or greater than the threshold. In these instances, the profiler 212 can make similar combinations to reduce the number of discrete values to reach the number of determined partitions. For example, the profiler 212 can combine the As and Bs into a single discrete value (e.g., (A, B)) to reach 3 discrete values (e.g., (A, B), C, and D).

Regardless of whether there is a greater number of discrete values than determined partitions or there is a lesser number of discrete values than the determined partitions, the profiler 212 can combine one or more values (e.g., values determined to be discrete values, values determined to not be discrete values) with one or more other values (e.g., values determined to be discrete values, values determined to not be discrete values) to reach the determined number of partitions. The determination of which discrete values to group can be based on reaching a uniform distribution of values for each discrete value. The uniform distribution can be based on the determined number of partitions. For example, if the determined number of partitions is 4, then the profiler 212 can seek to have discrete values or a grouping of discrete values that each have a frequency of 25%. If the determined number of partitions is 5, then the profiler 212 can seek to have discrete values that each have a frequency of 20%.

For example, returning to the example above, consider a partitioning column, in which 20% of the values are As, 37% of the values are Bs, 35% of the values are Cs, and 8% of the values are Ds. Furthermore, consider the determined number of partitions is 3. The profiler 212 can combine the As and Ds into a grouped discrete value, in which the instances of As and Ds in the partitioning column is 28%, such that the distribution is 28% for (A, D), 37% for B, and 35% for C. As illustrated, the percentages do not distribute evenly to a reference distribution of 33% for (A, D), 33% for B, and 33% for C. However, the profiler 212 can use an optimization function to reach a combination of values that most closely match the reference distribution.

The profiler 212 can perform this process for each training set received from the sampler 210. For example, if the sampler 210 provided three training sets, the profiler can generate three sets of discrete values. The profiler 212 can transmit each set of discrete values to the recommender 214.

The recommender 214 can calculate a cumulative deviation for each set of discrete values. In some embodiments, the recommender 214 can compare each of the sets of discrete values to determine similarities and differences in the identified discrete values to rank the sets. For example, a first set of discrete values includes values A, B, C, and D, a second set of discrete values includes values B, C, D, and F, and a third set of discrete values includes A, B, C, and F. The recommender can determine that all three sets include discrete values B and C. The recommender 214 can further determine that the first set of discrete values includes discrete values A and D, the second set of discrete values includes discrete values D and F, and the third set of discrete values includes discrete values A and F. The recommender 214 can further rank the sets based on the which set includes the set amount of deviation from the other sets. In this example, the second set of discrete values has 3 discrete values in common with both the first set of discrete values and the second set of discrete values. Whereas the first and third set have only two discrete values in common with at least one of the other sets of discrete values. Therefore, the second set of discrete values can be ranked the highest. The first and third set of discrete values can be tied for the second highest ranked sets.

The recommender 214 can further generate a graphical representation (e.g., histogram) for the highest ranked set of discrete values against a histogram of the validation set to determine if there is a uniform distribution between the two sets of discrete values. If there is a uniform distribution, the recommender 214 can recommend the number of partitions, and discrete values associated with the highest ranked random sample data set. If there is no uniform distribution, the recommender 214 continues to evaluate each next ranked random sample data set until a uniform distribution is detected.

The data extractor 202 can partition the data stored at the source system 204 based on the recommended number of partitions, partitioning column, and discrete values. The data extractor 202 can initialize a set of virtual machines extract the partitions in a parallel and send the partitions to the data transformer 206.

Figure 3:
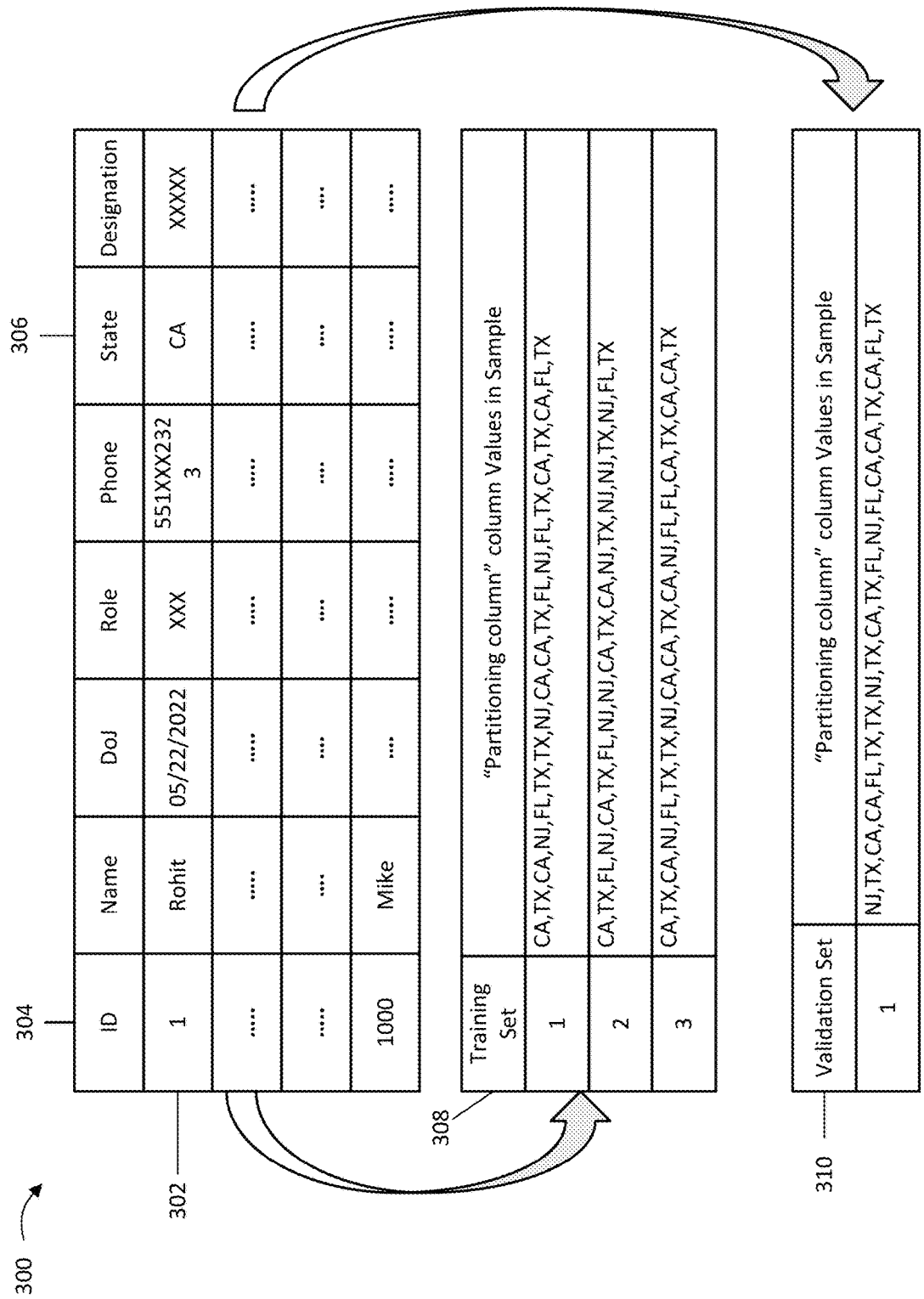
FIG. 3 is an illustration of training and validation sets generation, according to one or more embodiments.

FIG. 3 is an illustration 300 of training and validation sets generation, according to one or more embodiments. A source system can store data 302 (e.g., data 110), such as an employee table in a relational database. Furthermore, a user can request that a data integration service (e.g., data integration service 102) transmit the data 302 from the source system (e.g., source system 104) to a target system (e.g., target system 106). As illustrated, the data 302 is structured as a table with seven columns, including a key column 304. The key column 304 can include a unique index number for each row from 1 to 1000.

The data integration service can instruct a data extractor (e.g., data extractor 108) to determine discrete values for partitioning. The data extractor can communicate with the source system and the user to determine whether either the source system or the user can provide partitioning information. Based on neither the source system nor the user providing partitioning information, the data extractor can further request a partitioning discoverer (e.g., partitioning discoverer 208) to perform discovery of discrete value partitioning information and provide said information.

The partitioning discoverer can transmit a request to a sampler (e.g., sampler 210) to retrieve training and validation sets from the source system. The sampler can randomly collect samples from the data 302. For example, the sampler can generate a training set by randomly selecting rows from the data 302. For example, a first training set can include rows 200-301, 762, and 999. A second training set can include rows 3, 5, and 450-551. The sampler can return the training sets to the partitioning discoverer. As illustrated, the sample has returned three training sets. The partitioning discoverer can determine a number of partitions and a partitioning column. As illustrated, the partitioning discoverer has selected the state column as the partitioning column 306. As further illustrated each training set includes row values of the partitioning column that correspond to the rows of each training set that were collected by the sampler.

As illustrated, the sampler has generated a group of three training sets 308 and a validation set 310, where the first training set includes discrete values CA, TX, CA, NJ, FL, TX, TX, NJ, CA, CA, TX, FL, NJ, FL, TX, CA, TX, CA, FL, and TX; the second training set includes discrete values CA, TX, FL, NJ, CA, TX, FL, NJ, NJ, CA, TX, CA, NJ, TX, NJ, NJ, TX, NJ, FL, and TX; and the third training set includes discrete values CA, TX, CA, NJ, FL, TX, TX, NJ, CA, CA, TX, CA, NJ, FL, FL, CA, TX, CA, CA, TX. As further illustrated, the validation set 310 includes discrete values NJ, TX, CA, CA, FL, TX, TX, NJ, TX, CA, TX, FL, NJ, FL, CA, CA, TX, CA, FL, and TX. It should be appreciated that the sampler can create any number of groups of training sets and validation sets with any number of training sets and validation sets and is not limited to one group of three training sets and one validation set. The sampler can transmit the training sets 308 and the validation set 310 to the partitioning discoverer and the partitioning discoverer can transmit the training sets 308 and the validation set 310 to a profiler (e.g., profiler 212).

Figure 4:
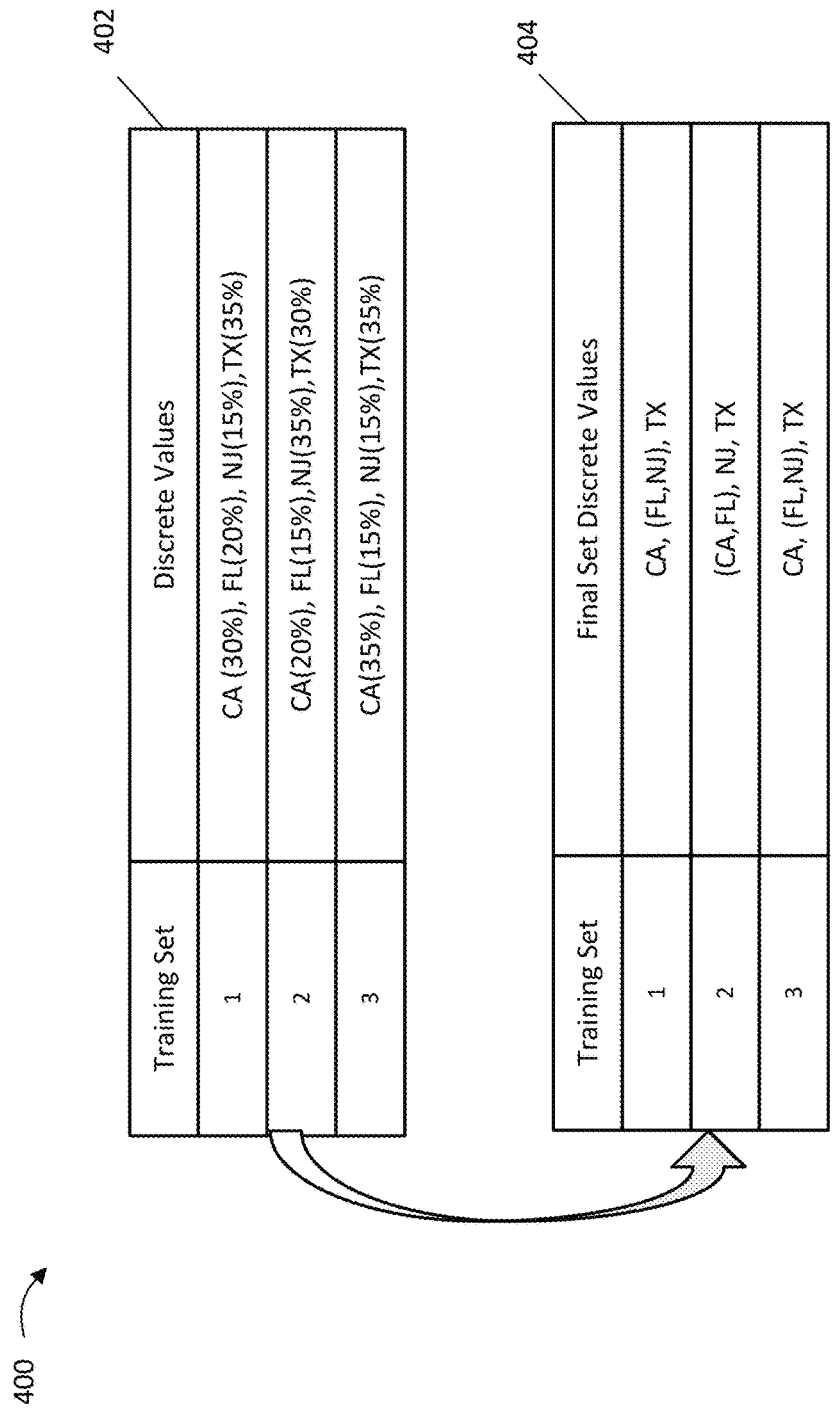
FIG. 4 is an illustration of discrete value identification generation, according to one or more embodiments.

FIG. 4 is an illustration 400 of discrete value identification generation, according to one or more embodiments. The profiler can analyze the training sets and identify the discrete values from the partitioning column. The profiler can further determine a frequency of each discrete value in the partitioning column. The frequency can be the number of instances of a discrete value in the partitioning column values. In some instances, the frequency is expressed as a percentage of the total number of partitioning column values. For example, a partitioning column can include ten total discrete values, and the discrete values are either an A, a B, a C, or a D. If there are a total of 2 As, then A's percentage can be 20%. The profiler can further determine if the frequency of the discrete value is equal to or greater than a threshold. As illustrated, the profiler has identified four discrete values (e.g., CA, FL, NJ, and TX) for the three training sets 402. The profiler has further determined the frequency of each discrete value in each of the training sets. As seen, for the first training set, the frequency of the discrete value CA is 30% in the first training set, the frequency of the discrete value FL is 20% in the first training set, the frequency of the discrete value NJ is 15% in the first training set, and frequency of the discrete value TX is 35%.

As indicated above, the profiler can group discrete values together to generate a uniform distribution based on the number of partitions. In this example, the partitioning discoverer can determine a number of partitions as 3, and therefore the profiler can seek a distribution of approximately 33% for each discrete value. The profiler can use an optimization algorithm to analyze different groupings of discrete values to determine which groupings result in a distribution of approximately 33% for each discrete value. As illustrated, the profiler has determined sets of discrete values 404 for each training set. As illustrated, the first training set, and the final training set includes a CA a grouping (FL, NJ), and TX. As indicated above, the frequency of the discrete value CA is 30% in the first training set. The combined frequency for the discrete values FL and NJ is 35% in the first training set, and the frequency of the discrete value CA is 30% in the first training set. The profiler has combined the discrete values to approximate a distribution of 33% for each discrete value. The profiler can transmit the sets of discrete values 404 to the partitioning discoverer, and the partitioning discoverer can transmit the sets of discrete values 404 to a recommender (e.g., recommender 214).

FIG. 5 is an illustration 500 of determining discrete values for partitioning, according to one or more embodiments. The recommender can calculate a cumulative deviation for each set of discrete values. The recommender can iteratively compare each discrete value in each set to each other discrete value in each other set to determine whether there is any deviation in discrete values.

Take for example, the first training set 502, the discrete values are CA, (FL, NJ) and TX. The recommender can iteratively compare the discrete value CA of the first training set 502 to each discrete value in the second training set 504. The second training set 504 does not include a discrete value CA, and therefore, the recommender can generate a 0. The recommender can iteratively compare the discrete value CA of the first training set 502 to each discrete value in the third training set 506. The third training set 506 also does not include a discrete value CA, and therefore, the recommender can generate a 0. The deviation sub-score for CA for the first training set can be 0 (e.g., 0+0).

The recommender can iteratively compare the discrete value (FL, NJ) of the first training set 502 to each discrete value in the second training set 504. The second training set 504 does not include a discrete value (FL, NJ), and therefore, the recommender can generate a 0. The recommender can iteratively compare the discrete value (FL, NJ) of the first training set 502 to each discrete value in the third training set. The third training set 506 also does not include a discrete value (FL, NJ), and therefore, the recommender can generate a 0. The deviation sub-score for (FL, NJ) for the first training set can be 0 (e.g., 0+0).

The recommender can iteratively compare the discrete value TX of the first training set 502 to each discrete value in the second training set 504. The second training set 504 does include a discrete value TX, and therefore, the recommender can generate a 1. The recommender can iteratively compare the discrete value TX to each discrete value in the third training set. The third training set 506 also includes a discrete value TX, and therefore, the recommender can generate a 1. As illustrated, the deviation sub-score for TX for the first training set 502 can be 1 (e.g., 1+1). The cumulative deviation score for the first training set 502 can be 2 (e.g., (0+0)+ (0+0)+(1+1)=2)

The recommender can similarly also evaluate each discrete value in the second training set 504 and the third training set 506 to the discrete values in each other training set. As illustrated, both the second training set and the third training set can include the discrete values (CA, FL), NJ, and TX. The cumulative deviation score for the second and third training sets can be 4 (e.g., (0+1)+(0+1)+(1+1)=4).

The recommender can further rank each training set based on the cumulative deviation score. As illustrated, the first training set 502 has the lowest cumulative deviation score and therefore, the first training set 502 is the highest ranked training set. The second and third training sets each have cumulative deviations of 4 and therefore, each are tied for the second highest ranked training set. If, for example, either of the second or third training sets had a cumulative rank of 5 or 6, then that training set would be the third highest ranked training set and the training set with a cumulative deviation score of 4 would be the second highest ranked training set.

The recommender can further generate a graphical representation (e.g., histogram) for the highest ranked set of discrete values against a histogram of the validation set to determine if there is a uniform distribution. The recommender can access the validation set 508 and determine whether the discrete values match the discrete values of the highest ranked training set. In some embodiments, the validation set can include no grouped discrete values as it is initially unknown which training set will eventually be the highest ranked training set. As illustrated, the highest ranked training set (e.g., the first training set 502) includes a grouped discrete value (e.g., (FL, NJ). Therefore, the recommender can take a set of discrete values from the validation set 508 and combine the discrete values to match the highest ranked training set. For example, the recommender can group the four discrete values CA, FL, NJ, and TX such that the result is three discrete values CA, (FL, NJ), and TX.

The recommender can determine the frequency of the three discrete values of the highest ranked training set in the discrete values of the validation set. As illustrated, the recommender can determine that the discrete value CA appears in the validation set 7 times and therefore has a frequency of 35%. The recommender can determine that the discrete value (FL, NJ) also appears in the validation set 7 times and therefore also has a frequency of 35%. The recommender can determine that the discrete value TX appears in the validation set 6 times and therefore has a frequency of 35%. As illustrated, the recommender can determine that the distribution is a uniform distribution. For example, the recommender can compare the percentages to a reference percentage (e.g., CA 33%, (FL, NJ) 33%, and TX 33%) and determine that no percentage of a discrete value in the validation set is greater than a threshold value greater than or less than the reference percentage. The recommender can assume that if the validation set has a uniform distribution based on the discrete values of the highest ranked training set, then the data stored at the source system can be evenly partitioned based on the discrete values of the highest ranked training set.

If, for instance, the recommender determines that the distribution is not a uniform distribution, the recommender can repeat the process for the next highest ranked training set. For example, if the recommender determines that at least one of the percentages of a discrete value in the validation set is greater than a threshold value greater than or less than the reference percentage. In the event that the more than one training set is the next highest ranked training set, the recommender can select any of the next highest ranked training sets.

Upon identifying the highest ranked training set that results in a uniformly distributed validation set, the recommender can identify the discrete values of the training set to the partitioning discoverer. The partitioning discoverer can transmit the identity of the discrete values to the data extractor. The data extractor can initialize a set of virtual machines that can identify access data stored in the source system. The virtual machine can further partition the data based on the discrete values of the highest ranked training set. For example, the virtual machines can generate a first partition that includes all row values associated with the partitioning column value CA. The virtual machines can generate a second partition that includes all row values associated with the partitioning column values FL and NJ. The virtual machines can generate a third partition that includes all row values associated with the partitioning column value TX. The virtual machines can partition the data and transmit the data to the data transformer in a parallel.

In some embodiments, the data extractor does not store the discrete values to be used for a subsequent partitioning of the data stored at the source system. Therefore, even if the customer asked for the same data at the source system to be migrated to the same target system, the data extractor would redetermine the discrete values.

Figure 6:
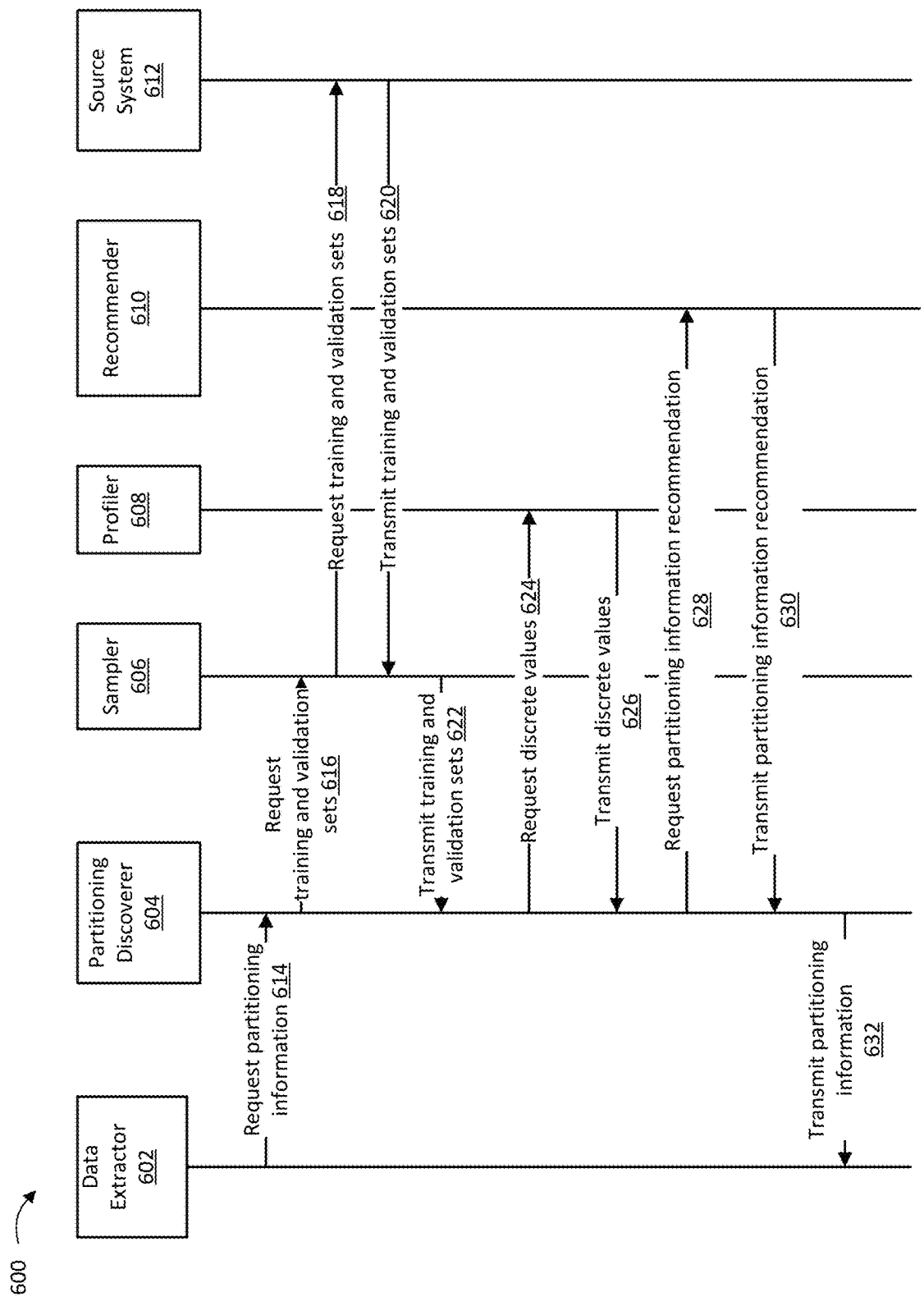
FIG. 6 is a signaling diagram for the discovery of source partitioning information, according to one or more embodiments.

FIG. 6 is a signaling diagram 600 for the discovery of source partitioning information, according to one or more embodiments. As illustrated, a data extractor 602 is in operable communication with a partitioning discoverer 604, a sampler 606, a profiler 608, a recommender 610, and a source system 612. While the operations of processes 600 and 700 are described as being performed by generic computers, any suitable device (e.g., a cloud services provider server) may be used to perform one or more operations of these processes. Processes 600 and 700 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 602, a data extractor can transmit, to the partitioning discoverer 704, a request for partitioning information. The data extractor 602 can be tasked with extracting data from a source system to be transmitted to a target system. The data can have a size such that transmitting the data is more efficient if the data were partitioned at the source system, transmitted in partitions, and reassembled at the target system.

At 614, the partitioning discoverer 604 can transmit a request to the sampler 606 for training and validation sets. The request can include an identity of the source system 612 and the data to be sampled.

At 618, the sampler 606 can transmit a request to the source system 612 for training and validation sets. In most instances, the sampler 606 can make requests for sampling, and the source system 612 can perform the sampling. In some instances, the sampler 606 can perform the sampling function at the source system 612.

At 620, the sampled data (e.g., training and validation sets) can be transmitted from the source system 612 to the sampler 706. At 622, the sampler 706 can transmit the sampled data to the partitioning discoverer 604. In response to receiving the sampled data, the partitioning discoverer 604 can determine a partitioning column and determine a number of partitions.

At 624, the partitioning discoverer 604 can transmit a request for discrete values to be used for partitioning to the profiler 608. The request can include the sampled data received from the sampler 606, the identity of the partitioning column, and the number of partitions. The profiler can determine a frequency of each discrete value in the partitioning column. The profiler 608 can further determine whether the frequency of each discrete value is equal to or greater than a threshold frequency. The profiler 608 can further determine a uniform distribution of discrete values based on the number of partitions. For each training set, the profiler 608 can further group discrete values together to reach a distribution that approximates the determined uniform distribution. The profiler 608 can further identify discrete values, including grouped discrete values as candidate discrete values to be used for partitioning the data at the source system.

At 626, the profiler 608 can transmit the candidate training and validation sets that identify discrete values to the partitioning discoverer 604.

At 628, partitioning discoverer 604 can transmit a request for partitioning information recommendation from the recommender 610. The request can include the candidate training and validation sets received from the profiler 608. For each of the training sets, the recommender 610 can calculate a cumulative deviation score. The recommender 610 can rank each of the training sets based on the cumulative deviation score.

The recommender 610 can then validate the highest ranked training set using the validation set. The validation can be based on whether distributing the values of the validation set across the adjusted discrete values (e.g., grouped discrete values) of the highest ranked training set results in an approximately uniform distribution of values.

At 630, the recommender 610 can transmit the recommendation to the partitioning discoverer 604. The recommendation can include the highest ranked training set that resulted in an approximately uniform distribution of the discrete values of the validation set. At 632, the partitioning discoverer 604 can transmit the recommendation to the data extractor 602. The data extractor can initialize a set of virtual machines that can access data stored in the source system. The virtual machine can further partition the data based on the discrete values of the highest ranked training set. The virtual machines can partition the data and transmit the data to the data transformer in a parallel.

Figure 7:
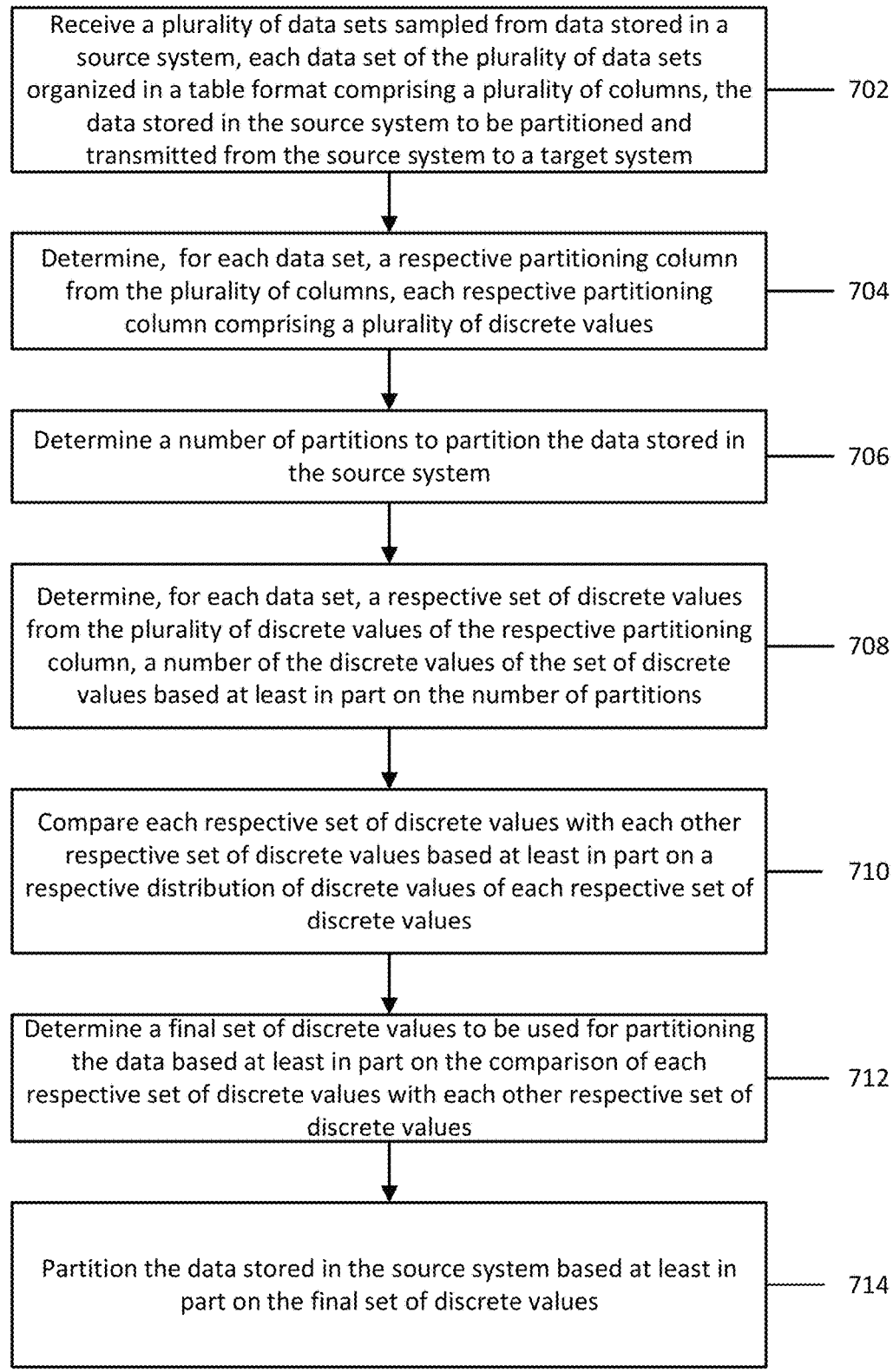
FIG. 7 is a process for partitioning data based on discrete values, according to one or more embodiments.

FIG. 7 is a process 700 for partitioning data based on discrete values, according to one or more embodiments. At 702, the method can include a computing system (e.g., a data integration system computing system) receiving a plurality of data sets sampled from data stored in a source system. Each data set of the plurality of data sets can be organized in a table format comprising a plurality of columns. The data stored in the source system can be scheduled to be partitioned and transmitted from the source system to a target system.

At 704, the method can include the computing system determining, each data set, a respective partitioning column from the plurality of columns. Each respective partitioning column can include a plurality of discrete values. The computing system can eliminate any key columns as candidate partitioning columns. The computing system can further take into account any user-based preferences for the partitioning column. The computing system can use a partitioning column discovery algorithm.

At 706, the method can include the computing system determining a number of partitions to partition the data stored in the source system. The computing system can determine the number of partitions based on various parameters. The parameters can include, for example, the resources (e.g., cores, threads allowed) that are available for the data extractor to use to partition and extract the data from the source system. The parameters can also include the consumption capacity of a downstream process. For example, the computing system can take into account the current workload capacity of the data transformer that is to receive the partitioned data.

At 708, the method can include determining, for each data set, a respective set of discrete values from the plurality of discrete values of the respective partitioning column. The number of the discrete values of the set of discrete values can be based at least in part on the number of partitions.

The computing system can determine a frequency of each discrete value of the plurality of discrete values in the respective partitioning column. The computing system can further compare each frequency of each discrete value to a threshold frequency. The computing system can determine the respective set of discrete values based at least in part on the comparison of each frequency of each discrete value to the threshold frequency. In particular, if the frequency of the discrete value in the partitioning column is equal to or greater than the threshold frequency, then the discrete value can be included in a set of discrete values.

In some instances, the number of determined discrete values in a respective set of discrete values does not match the number of determined partitions. In these instances, the computing system can compare the number of partitions to the number of discrete values of the respective set of discrete values. The computing system can further determine that the number of partitions is different than the number of discrete values of the respective set of discrete values. The computing system can then group two or more discrete values of the respective set of discrete values such that the number of partitions corresponds to the number of discrete values.

At 710, the method can include the computing system comparing each respective set of discrete values with each other respective set of discrete values based at least in part on a respective distribution of discrete values of each respective set of discrete values.

At 712, the method can include the computing system determining a final set of discrete values to be used for partitioning the data based at least in part on the comparison of each respective set of discrete values with each other respective set of discrete values. The computing system can compare the respective cumulative deviation score for each respective set of discrete values. The computing system can compare each discrete value of each set of discrete values with each discrete value of each other respective set of discrete values to determine a deviation of discrete values each respective set of discrete values with each other respective set of discrete values. The computing system can further determine a respective cumulative deviation score for each respective set of discrete values based at least in a part on the deviation of discrete values. The computing system can then rank the cumulative deviation scores. The computing system can then compare the cumulative deviation score rankings. The computing system can further determine the final set of discrete values from each respective set of discrete values based at least in part on the comparison of the respective cumulative deviation score for each respective set of discrete values.

At 714, the method can include the computing system partitioning the data stored in the source system based at least in part on the final set of discrete values. The computing system can further initialize a set of virtual machines based at least in part on the number of partitions. The computing system can then use the virtual machine to transmit the partitioned data in parallel from the source system to the target system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
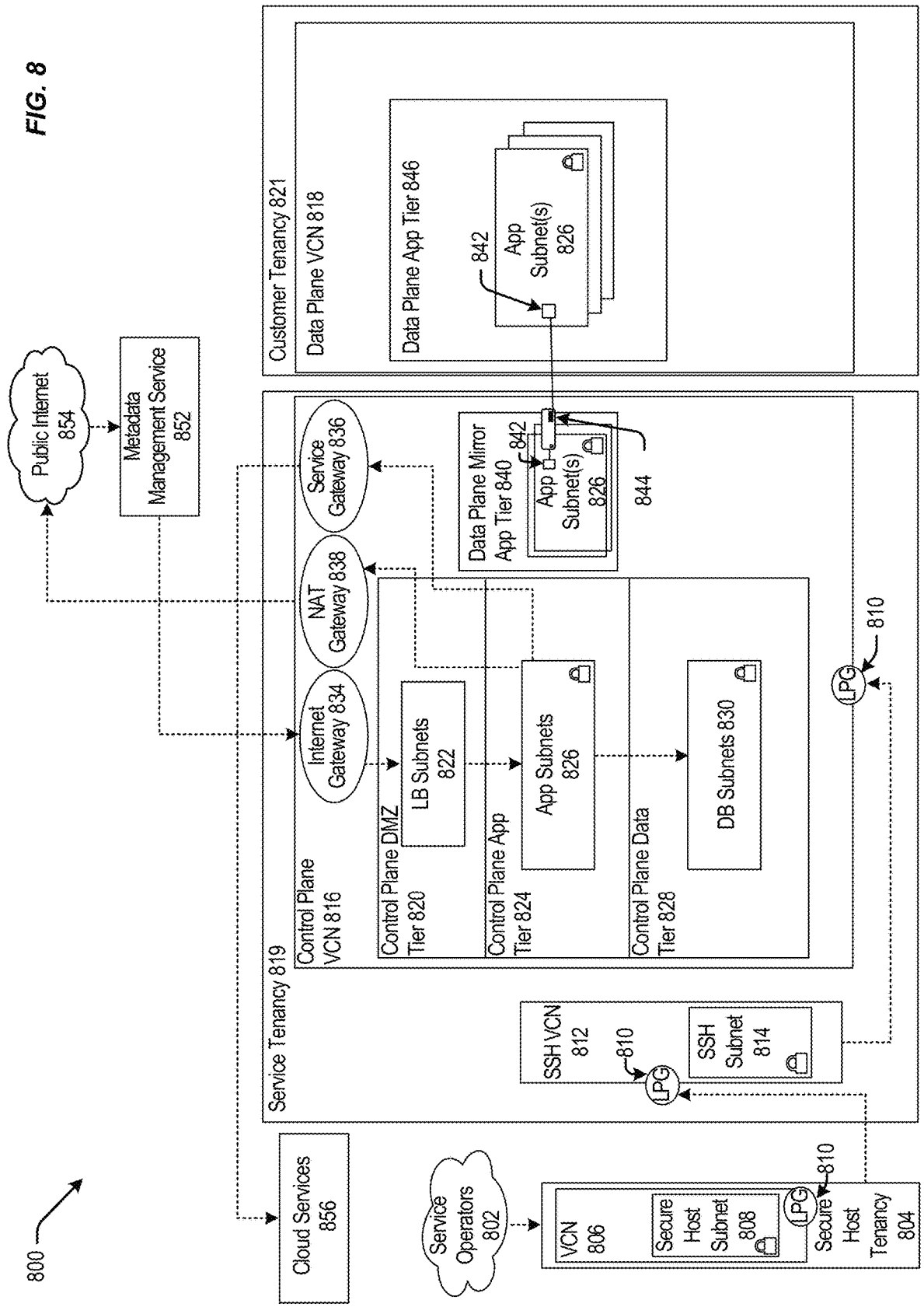
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
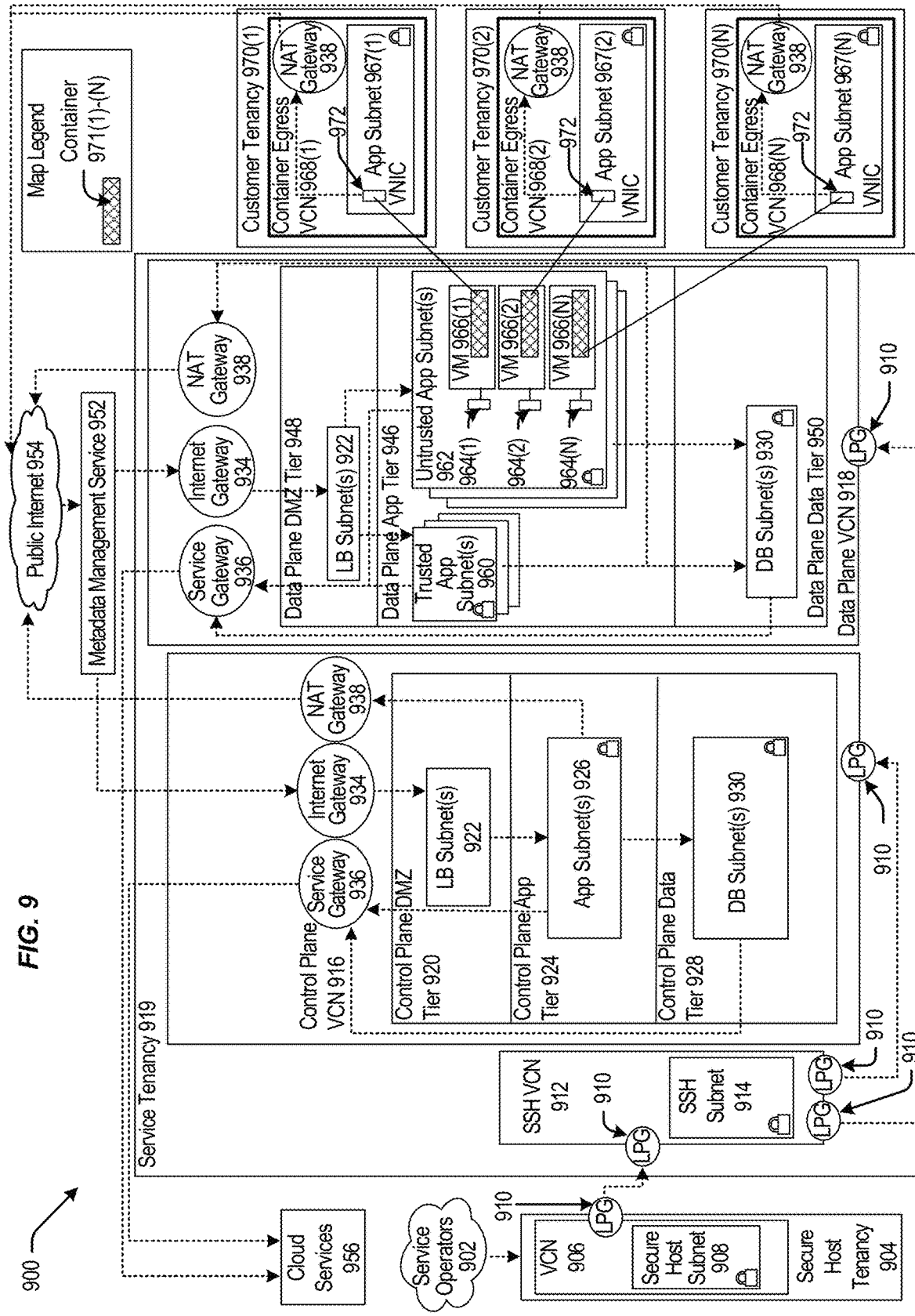
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
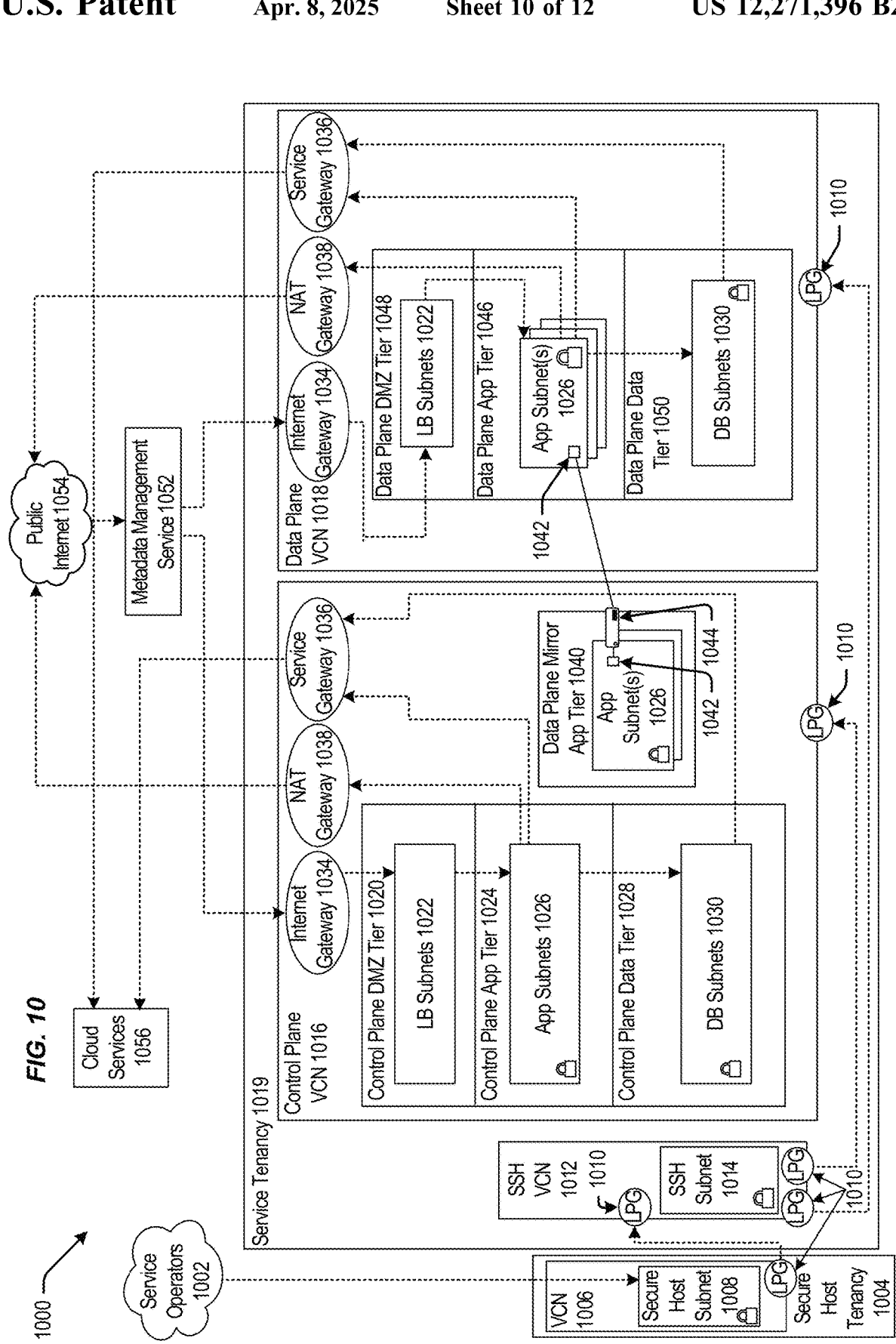
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
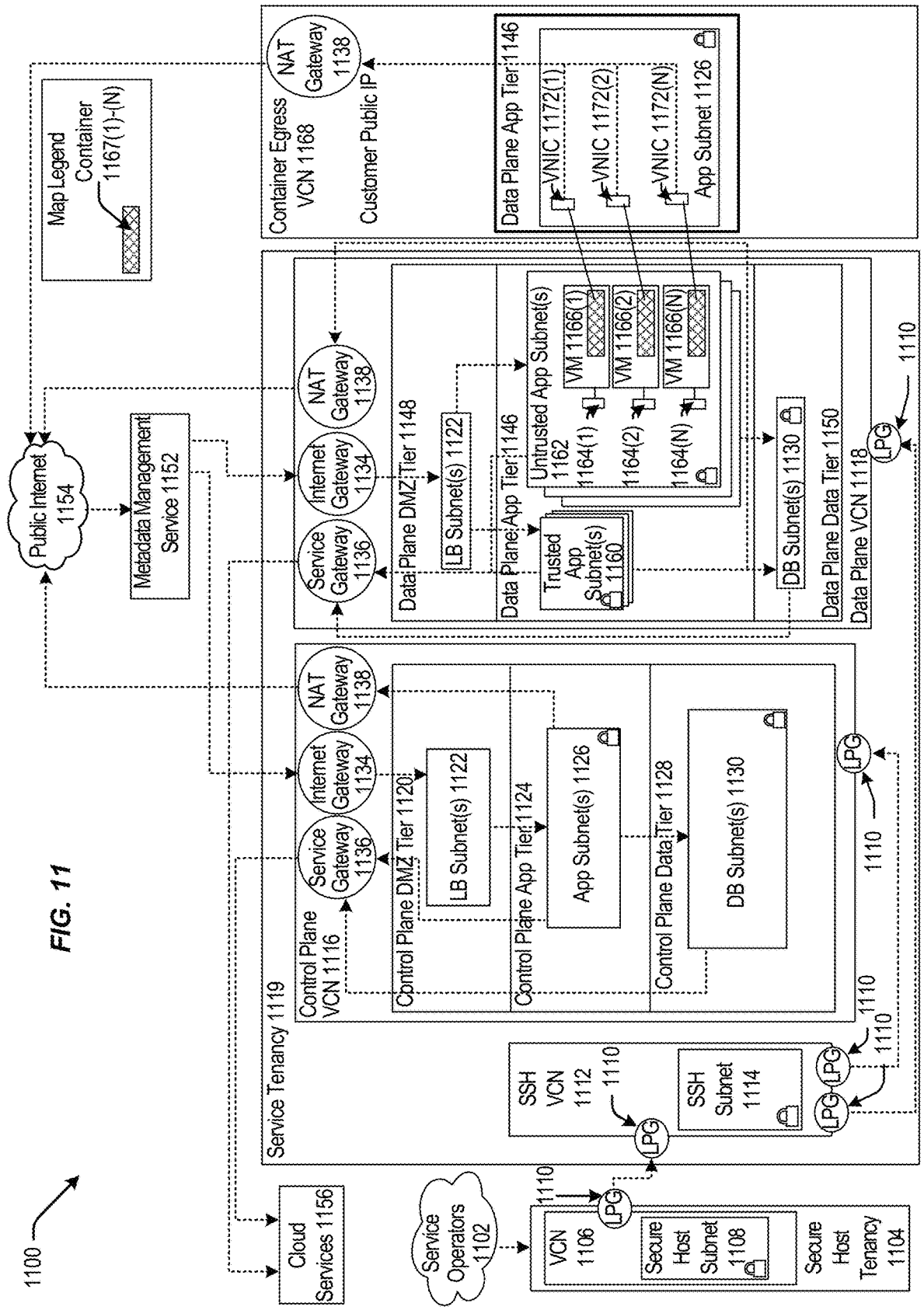
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
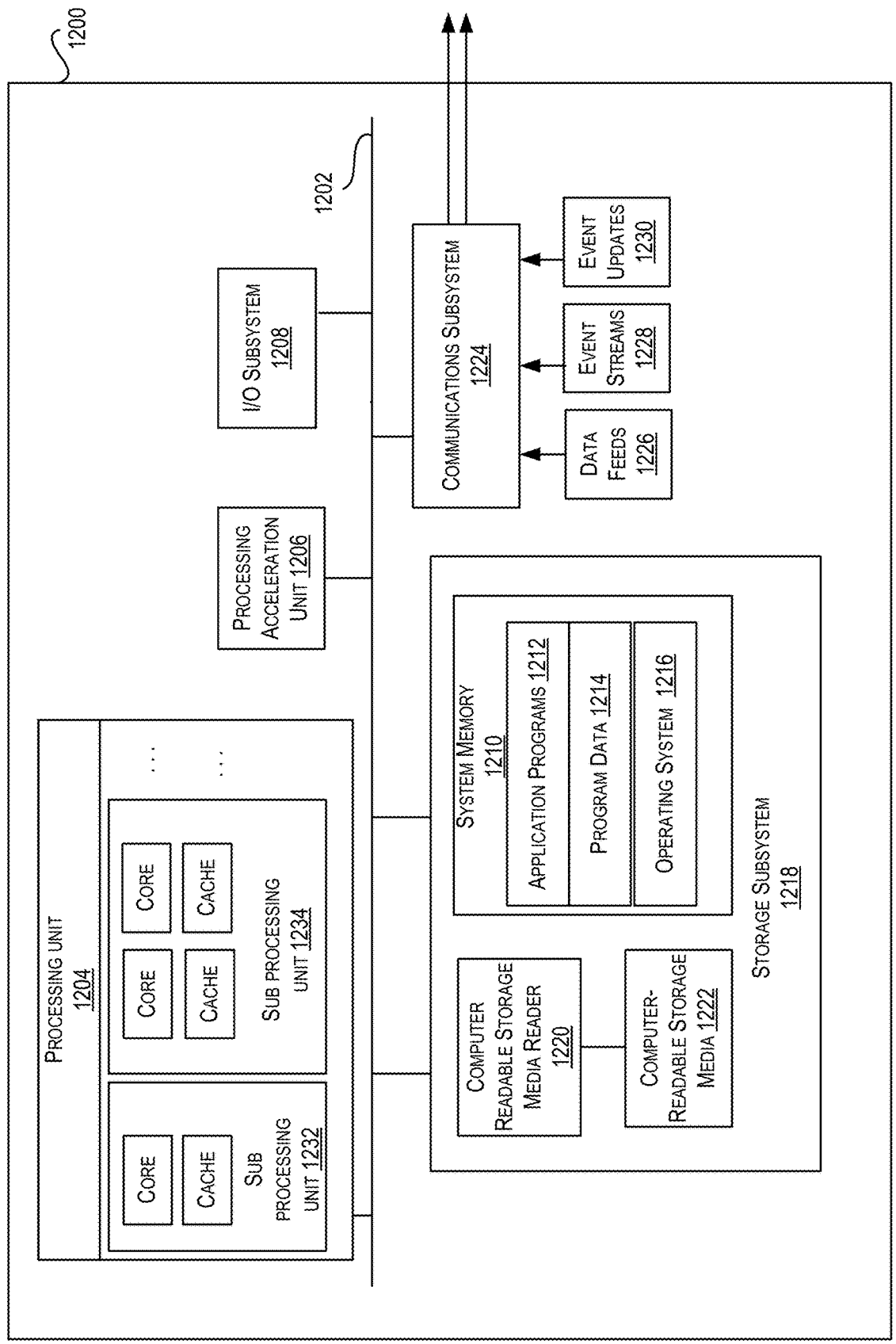
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing system, a plurality of data sets sampled from data stored in a source system, wherein partitioning information is not available or not provided at the source system;
   extracting, by the computing system and for each data set, a respective partitioning column, each respective partitioning column comprising a plurality of discrete values;
   extracting, by the computing system and for each data set, a respective set of discrete values from the plurality of discrete values of the respective partitioning column;
   generating, by the computing system, a respective cumulative deviation score for each respective set of discrete values;
   comparing, by the computing system, the generated cumulative deviation scores for the respective sets of discrete values;
   extracting, by the computing system, a final set of discrete values as the partitioning information to be used for partitioning the data based at least in part on the compared cumulative deviation scores; and
   partitioning, by the computing system, the data stored in the source system based at least in part on the partitioning information.

2. The method of claim 1, wherein the extracting of the respective set of discrete values from the plurality of discrete values of the respective partitioning column comprises:
   determining a frequency of each discrete value of the plurality of discrete values in the respective partitioning column;
   comparing each frequency of each discrete value to a threshold frequency; and
   determining the respective set of discrete values based at least in part on the comparison of each frequency of each discrete value to the threshold frequency.

3. The method of claim 1, wherein the method further comprises:
   determining a number of partitions to partition the data stored in the source system.

4. The method of claim 3, wherein the method further comprises:
   comparing the number of partitions to a number of discrete values of the respective set of discrete values;
   determining that the number of partitions is different than the number of discrete values of the respective set of discrete values; and
   grouping two or more discrete values of the respective set of discrete values such that the number of partitions corresponds to the number of discrete values.

5. The method of claim 3, wherein the method further comprises:
    determining the number of the discrete values of the set of discrete values being based at least in part on the number of partitions.

6. The method of claim 5, wherein the determining of the number of the discrete values of the set of discrete values comprises determining a distribution of the discrete values.

7. The method of claim 3, wherein the determining of the number of partitions comprises:
    determining a capability of a downstream process to receive the partitioned data, wherein the number of partitions is based at least in part on the capability of the downstream process.

8. The method of claim 3, wherein the method further comprises:
    initializing a set of virtual machines based at least in part on the number partitions; and
    transmitting, using the set of virtual machines, the partitioned data in parallel from the source system to a target system.

9. The method of claim 1, wherein the generating of the respective cumulative deviation score for each respective set of discrete values comprises:
    comparing each discrete value of each set of discrete values with each discrete value of each other respective set of discrete values to determine a deviation of discrete values, wherein the respective cumulative deviation score for each respective set of discrete values is based at least in a part on the deviation of discrete values.

10. A computing system, comprising:
    one or more processors; and
    a computer-readable medium including instructions that, when executed by the one or more processors, cause the one or more processors to:
        receive a plurality of data sets sampled from data stored in a source system, wherein partitioning information is not available or not provided at the source system;
        extract, for each data set, a respective partitioning column, each respective partitioning column comprising a plurality of discrete values;
        extract, for each data set, a respective set of discrete values from the plurality of discrete values of the respective partitioning column;
        generate a respective cumulative deviation score for each respective set of discrete values;
        compare the generated cumulative deviation scores for each the respective sets of discrete values;
        extract a final set of discrete values as the partitioning information to be used for partitioning the data based at least in part on the compared cumulative deviation scores; and
        partition the data stored in the source system based at least in part on the partitioning information.

11. The computing system of claim 10, wherein the extracting of the respective set of discrete values from the plurality of discrete values of the respective partitioning column comprises:
    determining a frequency of each discrete value of the plurality of discrete values in the respective partitioning column;
    comparing each frequency of each discrete value to a threshold frequency; and
    determining the respective set of discrete values based at least in part on the comparison of each frequency of each discrete value to the threshold frequency.

12. The computing system of claim 10, wherein the instructions that, when executed by the one or more processors, further cause the one or more processors to:
    determine a number of partitions to partition the data stored in the source system.

13. The computing system of claim 10, wherein
    determining the generating of the respective cumulative deviation score for each respective set of discrete values comprises:
    comparing each discrete value of each set of discrete values with each discrete value of each other respective set of discrete values to determine a deviation of discrete values, wherein the respective cumulative deviation score for each respective set of discrete values is based at least in a part on the deviation of discrete values.

14. A non-transitory computer-readable medium including stored thereon a sequence of instructions that, when executed by one or more processors, causes the one or more processors to:
    receive a plurality of data sets sampled from data stored in a source system, wherein partitioning information is not available or not provided at the source system;
    extract, for each data set, a respective partitioning column, each respective partitioning column comprising a plurality of discrete values;
    extract, for each data set, a respective set of discrete values from the plurality of discrete values of the respective partitioning column;
    generate a respective cumulative deviation score for each respective set of discrete values;
    compare the generated cumulative deviation scores for the respective sets of discrete values;
    extract a final set of discrete values as the partitioning information to be used for partitioning the data based at least in part on the compared cumulative deviation scores; and
    partition the data stored in the source system based at least in part on the partitioning information.

15. The non-transitory computer-readable medium of claim 14, wherein the instructions that, when executed by the one or more processors, further cause the one or more processors to:
    determine a number of partitions to partition the data stored in the source system.

16. The non-transitory computer-readable medium of claim 15, wherein the instructions that, when executed by the one or more processors, further cause the one or more processors to:
    compare the number of partitions to a number of discrete values of the respective set of discrete values;
    determine that the number of partitions is different than the number of discrete values of the respective set of discrete values; and
    group two or more discrete values of the respective set of discrete values such that the number of partitions corresponds to the number of discrete values.

17. The non-transitory computer-readable medium of claim 14, wherein the generating of the respective cumulative deviation score for each respective set of discrete values comprises:
    comparing each discrete value of each set of discrete values with each discrete value of each other respective set of discrete values to determine a deviation of discrete values, wherein the respective cumulative deviation score for each respective set of discrete values is based at least in a part on the deviation of discrete values.

\* \* \* \* \*